United States Patent
Gao et al.

(10) Patent No.: US 11,569,956 B2
(45) Date of Patent: Jan. 31, 2023

(54) METHODS AND APPARATUSES FOR PHASE TRACKING REFERENCE SIGNAL CONFIGURATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 16/966,792

(22) PCT Filed: Feb. 8, 2018

(86) PCT No.: PCT/CN2018/075846
§ 371 (c)(1),
(2) Date: Jul. 31, 2020

(87) PCT Pub. No.: WO2019/153195
PCT Pub. Date: Aug. 15, 2019

(65) Prior Publication Data
US 2021/0044402 A1    Feb. 11, 2021

(51) Int. Cl.
*H04W 4/00*    (2018.01)
*H04L 5/00*    (2006.01)

(52) U.S. Cl.
CPC .................. *H04L 5/0048* (2013.01)

(58) Field of Classification Search
CPC ........................... H04L 5/0048; H04L 5/0007
USPC ......................................................... 370/329
See application file for complete search history.

(56) References Cited

U.S. PATENT DOCUMENTS

2020/0229034 A1* 7/2020 Xu .................... H04W 72/0413

FOREIGN PATENT DOCUMENTS

WO    2017/188591 A1    11/2017
WO    2017/213382 A1    12/2017

OTHER PUBLICATIONS

Ericsson (R1-1720741, Remaining details on PTRS design, Nov. 27-Dec. 1, 2017) (Year: 2017).*
Nokia ( R1-1720896, Reno, Nevada, USA, Nov. 27-Dec. 1, 2017, "On remaining details on PT-RS design") (Year: 2017).*
Huawei, HiSilicon ( R1-1719440, Reno, USA, Nov. 27-Dec. 1, 2017, "Remaining issues of PTRS") (Year: 2017).*
Samsung (R1-1720312, Reno, USA, Nov. 27-Dec. 1, 2017, "Discussion on PT-RS") (Year: 2017).*

(Continued)

*Primary Examiner* — Maharishi V Khirodhar
(74) *Attorney, Agent, or Firm* — Sughrue Mion, PLLC

(57) ABSTRACT

Embodiments of the present disclosure relate to methods and apparatuses for Phase Tracking Reference Signal (PTRS) configuration. In example embodiments, a method implemented in a network device is provided. According to the method, a set of candidate thresholds associated with at least one of time density, frequency density and group pattern of PTRS to be transmitted between the network device and a terminal device are determined. At least one subset of candidate thresholds are selected from among the set of candidate thresholds. At least one threshold to be used by the terminal device for determining the density of the PTRS is selected from among the at least one subset of candidate thresholds. The network device then transmits an indication of the at least one threshold to the terminal device.

9 Claims, 7 Drawing Sheets

(56) References Cited

OTHER PUBLICATIONS

NEC, "Remaining issues on PTRS configurations", 3GPP TSG RAN WG1 Meeting #92, Athens, Greece, Feb. 26-Mar. 2, 2018, R1-1801902, 2 Pages.
Communication dated Dec. 14, 2021, issued by the Japanese Patent Office in application No. 2020-542864.
Intel Corporation, "Remaining Details on PT-RS", 3GPP TSG RAN WG1 Meeting 90bis, R1-1717374, Oct. 9-13, 2017, pp. 1-10, Prague, CZ.
Ericsson, "Remaining details on PTRS design", 3GPP TSG RAN WG1 Meeting 91, R1-1720741, Nov. 27-Dec. 1, 2017, pp. 1-15, Reno, USA.
NEC, "Remaining issues on PTRS configurations", 3GPP TSG RAN WG1 Meeting 91, R1-1720576, Nov. 27-Dec. 1, 2017, pp. 1-3, Reno, USA.
Samsung, "Discussion on PT-RS", 3GPP TSG RAN WG1 Meeting 91, R1-1720312, Nov. 27-Dec. 1, 2017, pp. 1-7, Reno, USA.
International Search Report of PCT/CN2018/075846 dated Oct. 29, 2018 [PCT/ISA/210].
Written Opinion of PCT/CN2018/075846 dated Oct. 29, 2018 [PCT/ISA/237].

* cited by examiner

METHODS AND APPARATUSES FOR PHASE TRACKING REFERENCE SIGNAL CONFIGURATION

CROSS REFERENCE TO RELATED APPLICATIONS

This application is a National Stage of International Application No. PCT/CN2018/075846, filed Feb. 8, 2018.

TECHNICAL FIELD

Embodiments of the present disclosure generally relate to the field of telecommunication, and in particular, to methods and apparatuses for Phase tracking Reference Signal (PTRS) configuration.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, multi-antenna schemes, beam management, reference signal transmission, and so on, are studied for new radio access (NR).

In NR, PTRS can be introduced to enable compensation for phase noise. Generally, the phase noise increases as the carrier frequency increases, so PTRS can be used to eliminate phase noise for a wireless network operating in high frequency bands. Currently, PTRS mapping patterns in time and frequency domains have been studied, but detailed patterns have not been designed completely. For example, it has been agreed that the density of PTRS ports in time domain is associated with Modulation and Coding Scheme (MCS) being scheduled, while the density of PTRS ports in frequency domain and the group pattern of PTRS ports (such as, the number of PTRS groups and the number of samples per PTRS group) are associated with a scheduled bandwidth (BW).

Typically, a network device (for example, an eNB or a gNB) may configure a plurality of MCS thresholds to a terminal device, such that the terminal device can determine the time density of PTRS ports based on the plurality of MCS thresholds and the scheduled MCS. In addition, the network device may also configure a plurality of BW thresholds to the terminal device, such that the terminal device can determine the frequency density and/or the group pattern of PTRS ports based on the plurality of bandwidth thresholds and the scheduled bandwidth. In this case, the signaling overhead for configuring different thresholds for PTRS might be significant. Therefore, a scheme of configuring different thresholds for the time density, frequency density and/or group pattern of PTRS ports is needed to balance configuration flexibility with the signaling overhead.

SUMMARY

In general, example embodiments of the present disclosure provide methods and apparatuses for PTRS configuration.

In a first aspect, there is provided a method implemented in a network device. According to the method, a set of candidate thresholds associated with a density of Phase Tracking Reference Signal (PTRS) to be transmitted between the network device and a terminal device are determined. At least one subset of candidate thresholds are selected from among the set of candidate thresholds. At least one threshold to be used by the terminal device for determining the density of the PTRS is selected from among the at least one subset of candidate thresholds. The network device then transmits an indication of the at least one threshold to the terminal device.

In a second aspect, there is provided a method implemented in a terminal device. According to the method, a set of candidate thresholds associated with a density of Phase Tracking Reference Signal (PTRS) to be transmitted between a network device and the terminal device are determined. At least one subset of candidate thresholds are selected from among the set of candidate thresholds. In response to receiving from the network device an indication of at least one threshold to be used for determining the density of the PTRS, the terminal device determines the at least one threshold based on the indication and the at least one subset of candidate thresholds.

In a third aspect, there is provided a network device. The network device comprises a processor and a memory coupled to the processor. The memory stores instructions that when executed by the processor, cause the network device to performs actions. The actions comprise: determining a set of candidate thresholds associated with a density of Phase Tracking Reference Signal (PTRS) to be transmitted between the network device and a terminal device; selecting, from among the set of candidate thresholds, at least one subset of candidate thresholds; selecting, from among the at least one subset of candidate thresholds, at least one threshold to be used by the terminal device for determining the density of the PTRS; and transmitting an indication of the at least one threshold to the terminal device.

In a fourth aspect, there is provided a terminal device. The terminal device comprises a processor and a memory coupled to the processor. The memory stores instructions that when executed by the processor, cause the terminal device to performs actions. The actions comprise: determining a set of candidate thresholds associated with a density of Phase Tracking Reference Signal (PTRS) to be transmitted between a network device and the terminal device; selecting, from among the set of candidate thresholds, at least one subset of candidate thresholds; and in response to receiving from the network device an indication of at least one threshold to be used for determining the density of the PTRS, determining the at least one threshold based on the indication and the at least one subset of candidate thresholds.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

In a seventh aspect, there is provided a computer program product that is tangibly stored on a computer readable storage medium. The computer program product includes instructions which, when executed on at least one processor, cause the at least one processor to perform the method according to the first or second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
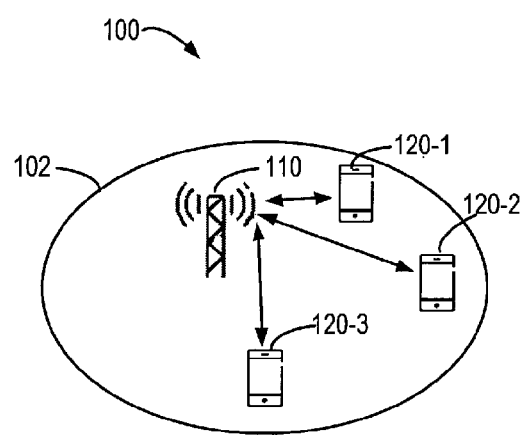
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1 shows an example communication network 100 in which embodiments of the present disclosure can be implemented. The network 100 includes a network device 110 and three terminal devices 120-1 and 120-3 (collectively referred to as terminal devices 120 or individually referred to as terminal device 120) served by the network device 110. The coverage of the network device 110 is also called as a cell 102. It is to be understood that the number of base stations and terminal devices is only for the purpose of illustration without suggesting any limitations. The network 100 may include any suitable number of base stations and the terminal devices adapted for implementing embodiments of the present disclosure. Although not shown, it would be appreciated that there may be one or more neighboring cells adjacent to the cell 102 where one or more corresponding network devices provides service for a number of terminal device located therein.

The network device 110 may communicate with the terminal devices 120. The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Conventionally, a network device (for example, an eNB or a gNB) may transmit downlink reference signals (RSs) such as Demodulation Reference Signal (DMRS), Channel State Information-Reference Signal (CSI-RS), Sounding Reference Signal (SRS), Phase Tracking Reference Signal (PTRS), fine time and frequency Tracking Reference Signal (TRS) and the like. A terminal device (for example, a user equipment) in the system may receive the downlink RSs on allocated resources. The terminal device may also transmit uplink RSs to the network device on corresponding allocated resources. For indicating the allocated resources and/or other necessary information for the RSs, the network device may transmit RS configurations to the terminal device prior to the transmissions of the RSs.

In addition to normal data communications, the network device 110 may transmit downlink reference signals (RSs) in a broadcast, multi-cast, and/or unicast manner to one or more of the terminal devices 120 in a downlink (DL). Similarly, one or more of the terminal devices 120 may transmit RSs to the network device 110 in an uplink (UL). As used herein, a "downlink" refers to a link from a network device to a terminal device, while an "uplink" refers to a link from the terminal device to the network device. Examples of the RSs may include but are not limited to downlink or uplink Demodulation Reference Signal (DMRS), Channel State Information-Reference Signal (CSI-RS), Sounding Reference Signal (SRS), Phase Tracking Reference Signal (PTRS), fine time and frequency Tracking Reference Signal (TRS) and so on.

Generally speaking, a RS is a signal sequence (also referred to as "RS sequence") that is known by both the network device 110 and the terminal device 120. For example, a RS sequence may be generated and transmitted by the network device 110 based on a certain rule and the terminal device 120 may deduce the RS sequence based on the same rule. In transmission of downlink and uplink RSs, the network device 110 may allocate corresponding resources (also referred to as "RS resources") for the transmission and/or specify which RS sequence is to be transmitted.

In some scenarios, both the network device 110 and the terminal device 120 are equipped with multiple antenna ports (or antenna elements) and can transmit specified RS sequences with the antenna ports (antenna elements). A set of RS resources associated with a number of RS ports are also specified. A RS port may be referred to as a specific mapping of part or all of a RS sequence to one or more resource elements (REs) of a resource region allocated for RS transmission in time, frequency, and/or code domains. Such resource allocation information may be indicated to the terminal device 120 prior to the transmission of the RSs.

In NR, PTRS can be introduced to enable compensation for phase noise. Generally, the phase noise increases as the carrier frequency increases, so PTRS can be used to eliminate phase noise for a wireless network operating in high frequency bands. Currently, PTRS mapping patterns in time and frequency domains have been studied, but detailed patterns have not been designed completely. For example, it has been agreed that the density of PTRS in time domain (also referred to as "the time density" of PTRS) is associated with Modulation and Coding Scheme (MCS) being scheduled, while the density of PTRS in frequency domain (also referred to as "the frequency density" of PTRS) and the group pattern of PTRS ports (such as, the number of PTRS groups and the number of samples per PTRS group) are associated with a scheduled BW (such as, the number of scheduled RBs).

For an OFDM-based system, the time density of PTRS may be one of the following: zero (that is, PTRS is not present), every $4^{th}$ symbol (that is, 1/4), every $2^{nd}$ symbol (that is, 1/2), or every symbol (that is, 1). The time density of PTRS is associated with the scheduled MCS. For example, Table 1 shows the association between the scheduled MCS and the time density of PTRS. In Table 1, $ptrs\text{-}MCS_1 \sim ptrs\text{-}MCS_4$ each represent a MCS threshold which needs to be configured by the network device.

TABLE 1

| Scheduled MCS | Time Density of PTRS ($L_{PTRS}$) |
| --- | --- |
| MCS < ptrs-$MCS_1$ | PTRS is not present |
| ptrs-$MCS_1$ <= MCS < ptrs-$MCS_2$ | 1/4 |
| ptrs-$MCS_2$ <= MCS < ptrs-$MCS_3$ | 1/2 |
| ptrs-$MCS_3$ <= MCS < ptrs-$MCS_4$ | 1 |

Similarly, the frequency density of PTRS may be one of the following: zero (that is, PTRS is not present), every RB (that is, 1), every $2^{nd}$ RB (that is, 1/2), or every $4^{th}$ RB (that is, 1/4). The frequency density of PTRS is associated with the scheduled bandwidth (that is, the number of scheduled RBs). For example, Table 2 shows the association between the scheduled bandwidth (represented as $N_{RB}$) and the frequency density of PTRS. In Table 2, $N_{RB0}$ and $N_{RB1}$ each represent a bandwidth threshold which needs to be configured by the network device.

TABLE 2

| Scheduled Bandwidth | Frequency density of PTRS ($K_{PTRS}$) |
| --- | --- |
| $N_{RB} < N_{RB0}$ | PTRS is not present |
| $N_{RB0} <= N_{RB} < N_{RB1}$ | 1/2 |
| $N_{RB1} <= N_{RB}$ | 1/4 |

Similarly, the group pattern of PTRS ports may include the number of PTRS groups and the number of samples per PTRS group. For example, Table 3 shows the association between the scheduled bandwidth (represented as $N_{RB}$) and the group pattern of PTRS. In some embodiments, the group pattern of PTRS may be used for Discrete Fourier Transform-Spread-Orthogonal Frequency Division Multiplexing (DFT-s-OFDM). In Table 3, $N_{RB0}$, $N_{RB1}$, $N_{RB2}$, $N_{RB3}$ and $N_{RB4}$ each represent a bandwidth threshold which needs to be configured by the network device.

TABLE 3

| Scheduled Bandwidth | Number of PTRS groups | Number of samples per PTRS group |
| --- | --- | --- |
| $N_{RB0} \le N_{RB} < N_{RB1}$ | 2 | 2 |
| $N_{RB1} \le N_{RB} < N_{RB2}$ | 2 | 4 |
| $N_{RB2} \le N_{RB} < N_{RB3}$ | 4 | 2 |
| $N_{RB3} \le N_{RB} < N_{RB4}$ | 4 | 4 |
| $N_{RB4} \le N_{RB}$ | 8 | 4 |

Typically, the network device 110 may configure a plurality of MCS thresholds (such as, ptrs-$MCS_1 \sim$ptrs-$MCS_4$ as shown in Table 1) to the terminal device 120, such that the terminal device 120 can determine the time density of PTRS based on the plurality of MCS thresholds and the scheduled MCS. In addition, the network device 110 may also configure a plurality of bandwidth thresholds (such as, $N_{RB0}$ and $N_{RB1}$ as shown in Table 2, and/or $N_{RB0}\sim N_{RB4}$ as shown in Table 3) to the terminal device, such that the terminal device can determine the frequency density and/or the group pattern of PTRS based on the plurality of bandwidth thresholds and the scheduled bandwidth. In this case, the signaling overhead for configuring different thresholds might be significant.

In order to solve the problems above and one or more of other potential problems, a solution of configuring different thresholds for at least one of time density, frequency density and group pattern of PTRS is provided in accordance with example embodiments of the present disclosure. With the solution, the signaling overhead for indicating different thresholds for the time density, frequency density and/or group pattern of PTRS can be reduced.

Figure 2:
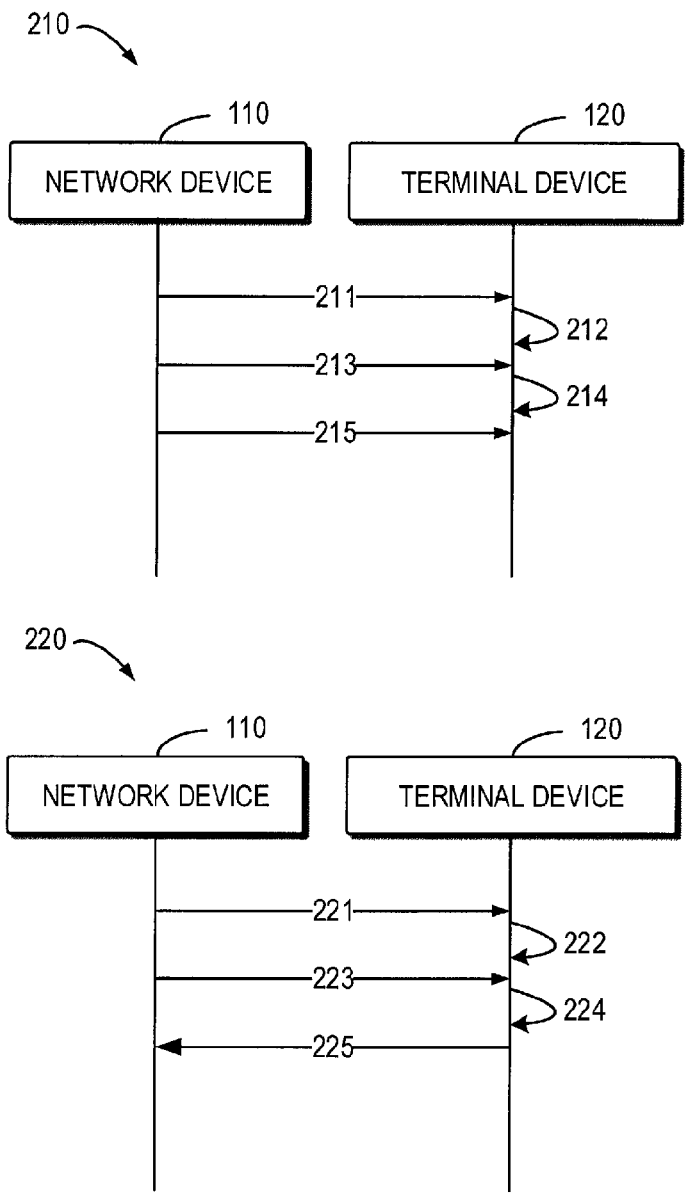
FIG. 2 illustrates processes for PTRS transmission according to some embodiments of the present disclosure.

Principle and implementations of the present disclosure will be described in detail below with reference to FIGS. 2-6, in which FIG. 2 shows two processes 210 and 220 for PTRS transmission according to some embodiments of the present disclosure. For the purpose of discussion, the processes 210 and 220 will be described with reference to FIG. 1. The processes 210 and 220 may involve the network device 110 and the terminal device 120 served by the network device 110.

As shown in FIG. 2, the process 210 is directed to the case of DL PTRS transmission. In some embodiments, the network device 110 may indicate (211) a plurality of thresholds associated with at least one of time density, frequency density and group pattern of PTRS to the terminal device 120 via higher layer signaling. Examples of the higher layer signaling may include but not limited to Radio Resource Control (RRC) and/or Medium Access Control (MAC) Control Element (CE)). In response to receiving from the network device 110 the plurality of thresholds, the terminal device 120 may determine (212) the at least one of time density, frequency density and group pattern of PTRS based on the plurality of thresholds as well as the scheduled MCS and/or bandwidth. In some embodiments, the network device 110 may indicate (213) a further PTRS configuration to the terminal device 120 via dynamic signaling (such as downlink control information (DCI)). For example, the further PTRS configuration may indicate that a PTRS port for PTRS transmission is associated with a DMRS port. In response to receiving the PTRS configuration from the network device 110, the terminal device 120 may determine (214) the PTRS port for PTRS transmission based on the PTRS configuration. Then, the network device 110 may transmit (215) a PTRS based on the PTRS port and the time density, frequency density and/or group pattern of PTRS. The terminal device 120 may detect the PTRS based on the PTRS port and the determined time density, frequency density and/or group pattern of PTRS so as to compensate phase noise.

As shown in FIG. 2, the process 220 is directed to the case of UL PTRS transmission. In some embodiments, the network device 110 may indicate (221) a plurality of thresholds associated with at least one of time density, frequency density and group pattern of PTRS to the terminal device 120 via higher layer signaling (such as RRC and/or MAC CE). In response to receiving from the network device 110 the plurality of thresholds, the terminal device 120 may determine (222) the at least one of time density, frequency density and group pattern of PTRS based on the plurality of thresholds as well as the scheduled MCS and/or bandwidth. In some embodiments, the network device 110 may indicate (223) a further PTRS configuration to the terminal device 120 via dynamic signaling (such as downlink control information (DCI)). For example, the further PTRS configuration may indicate that a PTRS port for PTRS transmission is associated with a DMRS port. In response to receiving the PTRS configuration from the network device 110, the terminal device 120 may determine (224) the PTRS port for PTRS transmission based on the PTRS configuration. Then, the terminal device 120 may transmit (225) a PTRS based on the PTRS port and the determined time density, frequency density and/or group pattern of PTRS. The network device 110 may detect the PTRS to compensate phase noise.

Figure 3:
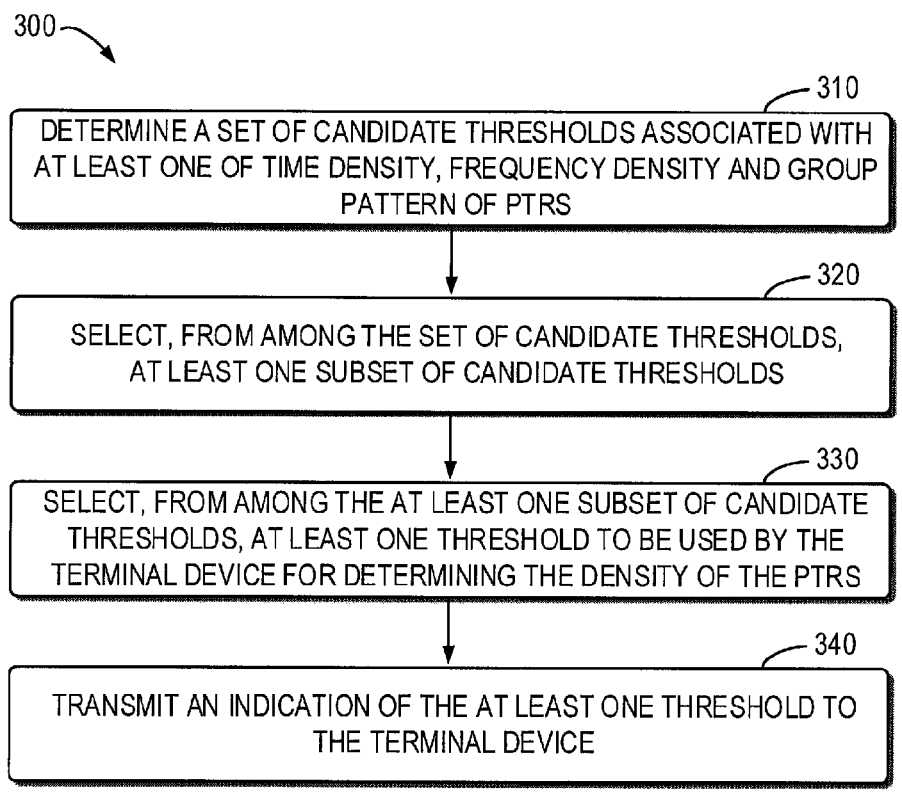
FIG. 3 shows a flowchart of an example method 300 for PTRS configuration according to some embodiments of the present disclosure.

In order to configure a plurality of thresholds associated with at least one of time density, frequency density and group pattern of PTRS, FIG. 3 shows a flowchart of an example method 300 for PTRS configuration according to some embodiments of the present disclosure. The method 300 can be implemented at the network device 110 as shown in FIG. 1. For the purpose of discussion, the method 300 will be described from the perspective of the network device 110 with reference to FIG. 1.

In act 310, the network device 110 determines a set of candidate thresholds associated with at least one of time density, frequency density and group pattern of PTRS to be transmitted between the network device 110 and the terminal device 120. In some embodiments, the PTRS may be one of the following: an UL PTRS to be transmitted from the terminal device 120 to the network device 110; and a DL PTRS to be transmitted from the network device 110 to the terminal device 120.

In some embodiments, for the frequency density of PTRS, at least one of $N_{RB0}$ and $N_{RB1}$ in Table 2 may not be needed to be configured by the network device 110. For example, these BW thresholds not configured may be fixed to some predetermined values. Similarly, in some embodiments, for the group pattern of PTRS, at least one of $N_{RB0}\sim N_{RB4}$ in Table 3 may not be needed to be configured by the network device. For example, these BW thresholds not configured may be fixed to some predetermined values. In some embodiments, for the frequency density and/or the group pattern of PTRS, the set of candidate BW thresholds can be determined only for those BW thresholds which need to be configured by the network device 110.

In some embodiments, for the frequency density and/or the group pattern of PTRS, the set of candidate BW thresholds associated with the frequency density and/or the group pattern of the PTRS can be determined such that each of the set of candidate BW thresholds is within a predetermined range. For example, the set of candidate BW thresholds may be represented as $\{S_1, S_2, S_3, \ldots S_k\}$, where k is an integer and k>1. For example, it has been agreed that the value range for scheduled BW thresholds in a Cyclic Prefix-Orthogonal Frequency Division Multiplexing (CP-OFDM) system is between the minimum value of 1 and the maximum value of 276. That is, all possible values for a BW threshold can be represented as: $\{1, 2, 3, \ldots 276\}$. In some embodiments, the set of candidate BW thresholds may include all possible values for a BW threshold as described above. For example, the set of candidate BW thresholds may be used for both of the DL and UL PTRSs.

In some embodiments, for the group pattern of PTRS, the set of candidate BW thresholds associated with the group pattern of the PTRS can be determined such that each of the set of candidate BW thresholds is within a predetermined range. For example, the set of candidate BW thresholds may be represented as $\{S_1, S_2, S_3, \ldots S_k\}$, where k is an integer and k>1. For example, it has been agreed that the value range for scheduled BW thresholds in a DFT-s-OFDM system is between the minimum value of 1 and the maximum value of 276. That is, all possible values for a BW threshold can be represented as: {1, 2, 3, . . . 276}. In some embodiments, the set of candidate BW thresholds may include all possible values for a BW threshold as described above. For example, the set of candidate BW thresholds may be only used for the UL PTRS.

In some embodiments, the set of candidate BW thresholds associated with the frequency density and/or the group pattern of the PTRS can be determined to be a subset of all possible values for a BW threshold. For example, the set of candidate BW thresholds associated with the frequency density and/or the group pattern of the PTRS may be a subset of $\{S_1, S_2, S_3, \ldots S_k\}$. In some embodiments, the subset may be unevenly selected from the set $\{S_1, S_2, S_3, \ldots S_k\}$. For example, the set $\{S_1, S_2, S_3, \ldots S_k\}$ may be divided into several ranges, for example, $R_1, R_2, R_3, \ldots R_m$. The range $R_1$ may be $\{S_1, S_2, \ldots S_{R\_1}\}$, where R_1 is an integer and R_1≥1. Likewise, the subset $R_i$ (where i>=2) may be $\{S_{(R\_(i-1))+1}, S_{(R\_(i-1))+2}, \ldots S_{R\_i}\}$, where R_i and R_(i−1) are both integers and R_i>R_(i−1). In some embodiments, the subset can be unevenly selected from different ranges. For different ranges, respective numbers of values selected for the subset may be different. For example, for the range $R_{i-1}$, the number of values selected for the subset may be more than that for the range $R_i$. In some embodiments, for different ranges, respective intervals can be used to select values for the subset. For example, an interval may represent the distance between two nearest selected values for subset in a respective range. In some embodiments, for different ranges, the intervals for selecting values for the subset may be different. For example, for the range $R_{i-1}$, the interval for selecting values for the subset may be smaller than that for the range $R_i$. For example, if the value of a BW threshold is relatively small, more values will be included in the subset for the BW threshold. If the value of the BW threshold is relatively large, fewer values will be included in the subset for the BW threshold. For example, if the value of a BW threshold is relatively small, the interval used to select the subset for the BW threshold may be relatively small. If the value of a BW threshold is relatively large, used to select the subset for the BW threshold may be relatively large. Specifically, in some embodiments, the set of candidate BW thresholds associated with the frequency density and/or the group pattern of the PTRS can be determined such that at least one of the set of candidate BW thresholds is a power of 2. For example, Table 4 shows all possible values of $2^n$, where n is an integer and 0≤n≤9.

TABLE 4

| n | 0 | 1 | 2 | 3 | 4 | 5 | 6 | 7 | 8 | 9 |
|---|---|---|---|---|---|---|---|---|---|---|
| $2^n$ | 1 | 2 | 4 | 8 | 16 | 32 | 64 | 128 | 256 | 512 |

As described above, a candidate BW threshold should be within a predetermined range of [1, 276]. Therefore, in some embodiments, $2^9$ as shown in Table 4 may be excluded from the set of candidate BW thresholds associated with the frequency density and/or the group pattern of the PTRS. In some embodiments, there may be no need to include a value in the set of candidate BW thresholds if the value is greater than a given value X. For example, $2^9$ can be replaced by the maximum value of possible scheduled BW thresholds (that is, 276). For example, the set of candidate BW thresholds can include at least one of {1, 2, 4, 8, 16, 32, 64, 128, 256, 276}. As another example, the set of candidate BW thresholds can include at least one of {1, 2, 4, 8, 16, 32, 64, 128, 276}, where 276 also replaces $2^8$ as shown in Table 4. For example, since 256 is close to 276, there may be no need to include 256 in the set of candidate BW thresholds. In some embodiments, there may be no need to include a value in the set of candidate BW thresholds if the value is below a given value Y. For example, the set of candidate BW thresholds can include at least one of {2, 4, 8, 16, 32, 64, 128, 256, 276}. As another example, the set of candidate BW thresholds can include at least one of {4, 8, 16, 32, 64, 128, 256, 276}. Alternatively, or in addition, more possible values as shown in Table 4 can be further excluded from the set of candidate BW thresholds so as to reduce the possible number of thresholds to be indicated. For example, in one embodiment, the set of candidate BW thresholds can be determined as: {1, 2, 4, 8, 16, 32, 64, 276}, where 128 is further excluded from the set of candidate BW thresholds. Alternatively, in another embodiment, the set of candidate BW thresholds can be determined as: {4, 8, 16, 32, 64, 128, 276}. Alternatively, in another embodiment, the set of candidate BW thresholds can be determined as: {3, 8, 16, 32, 64, 128, 276}, where 3 replaces the values of 1, 2, and 4 as shown in Table 4. For example, there may be no need to configure a very small BW threshold to the terminal device.

In some embodiments, the set of candidate BW thresholds associated with the frequency density and/or the group pattern of the PTRS can be determined to be a subset of all possible values for a BW threshold. Specifically, in some embodiments, the set of candidate BW thresholds associated with the frequency density and/or the group pattern of the PTRS can be determined such that at least one of the set of candidate BW thresholds is a square of a natural number. For example, Table 5 shows all possible values of $n^2$, where n is a natural number and 1≤n≤17.

TABLE 5

| n | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|
| $n^2$ | 1 | 4 | 9 | 16 | 25 | 36 | 49 | 64 | 81 | 100 | 121 | 144 | 169 | 196 | 225 | 256 | 384 |

As described above, a candidate BW threshold should be with a predetermined range of [1, 276]. Therefore, in some embodiments, $17^2$ as shown in Table 5 may be excluded from the set of candidate BW thresholds associated with the frequency density and/or the group pattern of the PTRS. For example, $17^2$ can be replaced by the maximum value of possible scheduled BW thresholds (that is, 276). In this case, for example, the set of candidate BW thresholds can include at least one of: {1, 4, 9, 16, 25, 36, 49, 64, 81, 100, 121, 144, 169, 196, 225, 276}, where 276 also replaces $16^2$ as shown in Table 4 as 256 is close to 276. Alternatively, or in addition, more possible values as shown in Table 5 can be further excluded from the set of candidate BW thresholds so as to reduce the possible number of BW thresholds to be indicated. For example, in one embodiment, the set of candidate BW thresholds can include at least one of: {1, 4, 9, 16, 25, 49, 81, 121, 169, 196, 225, 276}, where 36, 64, 100 and 144 are further excluded from the set of candidate BW thresholds. As another example, in one embodiment, the set of candidate BW thresholds can include at least one of: {4, 9, 16, 25, 36, 49, 64, 81, 100, 121, 144, 169, 196, 225, 276}. As another example, in one embodiment, the set of candidate BW thresholds can include at least one of: {1, 9, 16, 25, 36, 49, 64, 81, 100, 121, 144, 169, 196, 225, 276}. As another example, in one embodiment, the set of candidate BW thresholds can include at least one of: {9, 16, 25, 36, 49, 64, 81, 100, 121, 144, 169, 196, 225, 276}.

In some embodiments, the set of candidate BW thresholds associated with the frequency density and/or the group pattern of the PTRS can be a subset of {1, 2, 3, . . . 276}. Specifically, in some embodiments, the set of candidate BW thresholds associated with the frequency density and/or the group pattern of the PTRS can be determined such that one of the set of candidate BW thresholds is a power of 2 and another one of the set of candidate BW thresholds is a square of a natural number. For example, the set of candidate BW thresholds can be determined as {1, 4, 8, 16, 32, 49, 64, 121, 169, 196, 225, 276}, which include some values from Table 4 and some values from Table 5.

In some embodiments, the maximum value of bandwidth (that is, the maximum number of available RBs) configured for the terminal device 120, may be determined based on at least one of the value of subcarrier spacing, the bandwidth of bandwidth part, the bandwidth of carrier, the bandwidth of component carrier and the frequency range. In some embodiments, for different values of bandwidth, different values of maximum number of available RBs, different values of subcarrier spacing, different values of configured bandwidth of bandwidth part, different values of configured bandwidth of carrier, different values of component carrier and/or different frequency ranges, the set of candidate BW thresholds may be different. For example, at least one value in the set of candidate BW thresholds and/or the number of values in the set of candidate BW thresholds may be different in the above different cases.

In some embodiments, for the time density of PTRS, at least one of ptrs-MCS$_1$~ptrs-MCS$_4$ in Table 1 may not be needed to be configured by the network device 110. For example, in some embodiments, the at least one of ptrs-MCS$_1$~ptrs-MCS$_4$ not configured by the network device 110 can be fixed to some predetermined values. In one embodiment, ptrs-MCS$_4$ in Table 1 may not be needed to be configured by the network device 110, and ptrs-MCS$_4$ can be fixed to a predetermined value. For example, there may be no entry of ptrs-MCS$_4$ in Table 1. For example, it has been agreed that for initial transmission in the CP-OFDM system, in case that a higher layer parameter MCS-Table-PDSCH is not set to '256QAM', a first table about MCS (also referred to as "MCS-Table-1") can be used, in which the value range for scheduled MCS is between the minimum value of 0 and the maximum value of 28. If the higher layer parameter MCS-Table-PDSCH is set to '256QAM', a second table about MCS (also referred to as "MCS-Table-2") can be used, in which the value range for scheduled MCS thresholds (for time density for CP-OFDM) is between the minimum value of 0 and the maximum value of 27. For example, ptrs-MCS$_4$ may be fixed to be 29 for MCS table 1 in NR for CP-OFDM in both DL and UL. For another example, ptrs-MCS$_4$ may be fixed to be 28 for MCS table 2 in NR for CP-OFDM in both DL and UL. In some embodiments, for the time density of PTRS, the set of candidate MCS thresholds can be determined only for those MCS thresholds which need to be configured by the network device 110.

In some embodiments, for the time density of PTRS, the set of candidate MCS thresholds associated with the time density of the PTRS can be determined such that each of the set of candidate MCS thresholds is within a predetermined range. In some embodiments, if the value range for scheduled MCS (for time density for CP-OFDM) is between the minimum value of 0 and the maximum value of 28, since the greatest MCS threshold should be greater than the scheduled MCS, all possible values for a MCS threshold can include every value between 0 and 29. That is, all possible values for a MCS threshold can be represented as: {0, 1, 2, . . . 29}. Alternatively, in other embodiments, if the value range for scheduled MCS (for time density for CP-OFDM) is between the minimum value of 0 and the maximum value of 27, since the greatest MCS threshold should be greater than the scheduled MCS, all possible values for a MCS threshold can include every value between 0 and 28. That is, all possible values for a MCS threshold can be represented as: {0, 1, 2, . . . 28}.

In some embodiments, in order to reduce the possible number of MCS thresholds to be indicated, the set of candidate MCS thresholds associated with the time density of the PTRS can be a subset of all possible values for a MCS threshold. Specifically, in some embodiments, the set of candidate MCS thresholds associated with the time density of the PTRS can be determined based on a predetermined modulation order. In some embodiments, for example, if QPSK is configured, the set of candidate MCS thresholds associated with the time density of the PTRS can be determined to be {0, 1, 2, . . . 9} for MCS-Table-1 or {0,1, 2, 3, 4} for MCS-Table-2. In some embodiments, for example, if 16QAM is configured, the set of candidate associated with the time density of the PTRS can be determined to be {10, 11, 12, . . . 16} for MCS-Table-1 or {5, 6, 7, 8, 9, 10} for MCS-Table-2. In some embodiments, for example, if 64QAM is configured, the set of candidate associated with the time density of the PTRS can be determined to be {17, 18, 19, . . . 28} for MCS-Table-1 or {11, 12, 13, . . . 19} for MCS-Table-2. In some embodiments, for example, the set of candidate associated with the time density of the PTRS can be determined to be {20, 21, 22, . . . 27} for MCS-Table-2.

In some embodiments, in order to further reduce the possible number of MCS thresholds to be indicated, a step size based on the predetermined modulation order can be applied to further reduce the set of candidate MCS thresholds associated with the time density of the PTRS. The greater the step size, the more values are excluded from the set of candidate MCS thresholds associated with the time density of the PTRS. For example, in some embodiments, a first step size can be applied if QPSK is configured, a second step size can be applied if 16QAM is configured and a third step size can be applied if 64QAM is configured. For example, the first step size may be greater than the second step size, and/or the second step size may be greater than the third step size. In one embodiment, for example, the first step size may be 4. For example, for MCS-Table-1, the set of candidate MCS thresholds for QPSK can be further reduced from {0, 1, 2, . . . 9} to be {0, 4, 5, 9} or {0, 4, 9} or {0, 5, 9}. For example, for MCS-Table-2, the set of candidate MCS thresholds for QPSK can be further reduced from {0, 1, 2, 3, 4} to be {0, 2, 4} or {0, 4}. In one embodiment, for example, the second step size may be 3. For example, for MCS-Table-1, the set of candidate MCS thresholds for 16QAM can be further reduced from {10, 11, 12, . . . 16} to be {10, 13, 16} or {10, 16}. For example, for MCS-Table-2, the set of candidate MCS thresholds for 16QAM can be further reduced from {5, 6, 7, 8, 9, 10} to be {5, 8, 10} or {5, 7, 10}. In another embodiment, for example, the third step size may be 2. For example, for MCS-Table-1, the set of candidate MCS thresholds for 64QAM can be further reduced from {17, 18, 19, . . . 28} to be {17, 19, 21, 23, 25, 27} or {18, 20, 22, 24, 26, 28}. For example, for MCS-Table-2, the set of candidate MCS thresholds for 64QAM can be further reduced from {11, 12, 13, . . . 19} to be {11, 13, 15, 17, 19} or {12, 14, 16, 18}. For example, for MCS-Table-2, the set of candidate MCS thresholds for 256QAM can be further reduced from {20, 21, 22, . . . 27} to be {20, 22, 24, 26} or {21, 23, 25, 27}.

In act 320, upon determining the set of candidate thresholds, the network device 110 selects at least one subset of candidate thresholds therefrom.

In some embodiments, for different thresholds associated with the time density, frequency density and/or group pattern of the PTRS, different subsets of candidate thresholds can be selected from the set of candidate thresholds respectively. In some embodiments, the subsets of candidate thresholds may be partially overlapped with each other. In other embodiments, the subsets of candidate thresholds may not be overlapped at all. In some embodiments, respective sizes of different subsets of candidate thresholds may be same or different. In some embodiments, the selected values in a subset of candidate thresholds may be contiguous or non-contiguous. In some embodiments, there may be some values which are included in at least two subsets of candidate thresholds. Specifically, for example, there may be some values which are included in all subsets of candidate thresholds. For example, the minimum possible value of candidate threshold and/or the maximum possible value of candidate threshold may be included in at least two subsets of candidate thresholds or included in all subsets of candidate thresholds. More detailed examples according to embodiments of the present disclosure will be shown as below.

In some embodiments, for the frequency density of PTRS, two BW thresholds $N_{RB0}$ and $N_{RB1}$ as shown in Table 2 need to be configured to the terminal device 120. Therefore, two subsets of candidate thresholds can be selected for the two BW thresholds respectively.

Figure 4:
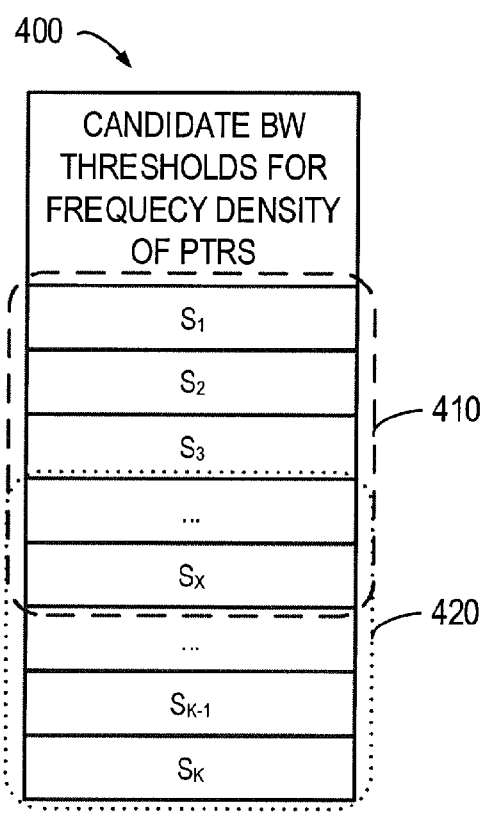
FIG. 4 shows a schematic diagram of different subsets determined for different BW thresholds according to some embodiments of the present disclosure.

For example, FIG. 4 shows an example of such embodiments. As shown in FIG. 4, the set of candidate thresholds 400 determined in act 310 can be represented as $\{S_1, S_2, S_3, \ldots S_k\}$, where k is an integer, $1 \leq k \leq 276$ and $1 \leq S_k \leq 276$. A subset 410 can be selected from the set 400 for the BW threshold $N_{RB0}$, and another subset 420 can be selected from the set 400 for the BW threshold $N_{RB1}$.

In some embodiments, for example, the subset 410 may be $\{S_{X\_1}, S_{X\_2}, \ldots S_{X\_M}\}$, and the subset 420 may be $\{S_{Y\_1}, S_{Y\_2}, \ldots S_{Y\_N}\}$, where M and N are the number of values in the subsets 410 and 420 respectively. In addition, X_i (where $1 \leq i \leq M$) may selected from the set $\{S_1, S_2, S_3, \ldots S_k\}$, while Y_j (where $1 \leq j \leq N$) may be selected from the set $\{S_1, S_2, S_3, \ldots S_k\}$. As another example, the subset 410 may be $\{S_1, S_{X\_1}, S_{X\_2}, \ldots S_{X\_M}\}$, where the number of values in the subset 410 may be M+1. The subset 420 may be $\{S_1, S_{Y\_1}, S_{Y\_2}, \ldots S_{Y\_N}\}$, where the number of values in the subset 420 may be N+1. In addition, X_i (where $1 \leq i \leq M$) may be selected from the set $\{S_2, S_3, \ldots S_k\}$, while Y_j (where $1 \leq j \leq N$) may be selected from the set $\{S_2, S_3, \ldots S_k\}$. As another example, the subset 410 may be $\{S_{X\_1}, S_{X\_2}, \ldots S_{X\_M}, S_k\}$, where the number of values in the subset 410 may be M+1. The subset 420 may be $\{S_{Y\_1}, S_{Y\_2}, \ldots S_{Y\_N}, S_k\}$, where the number of values in the subset 420 may be N+1. In addition, X_i (where $1 \leq i \leq M$) may be selected from the set $\{S_1, S_2, S_3, \ldots S_{k-1}\}$, while Y_j (where $1 \leq j \leq N$) may be selected from the set $\{S_1, S_2, S_3, \ldots S_{k-1}\}$. As another example, the subset 410 may be $\{S_1, S_{X\_1}, S_{X\_2}, \ldots S_{X\_M}, S_k\}$, where the number of values in the subset 410 may be M+2. The subset 420 may be $\{S_1, S_{Y\_1}, S_{Y\_2}, \ldots S_{Y\_N}, S_k\}$, where the number of values in the subset 420 may be N+2. In addition, X_i (where $1 \leq i \leq M$) may be selected from the set $\{S_2, S_3, \ldots S_{k-1}\}$, while Y_j (where $1 \leq j \leq N$) may be selected from the set $\{S_2, S_3, \ldots S_{k-1}\}$.

In some embodiments, for example, the subset 410 may be $\{S_1, S_2, \ldots S_x\}$, and the subset 420 may be $\{S_Y, S_{Y+1}, \ldots S_K\}$, where X and Y are both integers, $1 \leq X \leq K$ and $1 \leq Y \leq K$. In some embodiments, the subsets 410 and 420 can be overlapped with each other as shown in FIG. 4. In this case, for example, $X \geq Y$. In other embodiments, the subsets 410 and 420 may not be overlapped with each other. In this case, for example, $X < Y$. In some embodiments, the subset 410 or 420 can be continuously selected from the set 400 as shown in FIG. 4. In other embodiments, the subset 410 or 420 may not be continuously selected from the set 400.

In some embodiments, some additional factors can be considered in selecting respective subsets for different BW thresholds.

For example, in some embodiments, if the frequency density of 1/4 as shown in Table 2 is disabled, the BW threshold $N_{RB1}$ can be fixed to $S_K$. That is, there may be no need to select the subset for the BW threshold $N_{RB1}$. Moreover, there may be no need to indicate the BW threshold $N_{RB1}$ to the terminal device. In some embodiments, if the frequency density of 1/2 as shown in Table 2 is disabled, the BW threshold $N_{RB1}$ can be equal to the BW threshold $N_{RB0}$. That is, the subset for the BW threshold $N_{RB0}$ can be same as that for the BW threshold $N_{RB1}$.

In some embodiments, if PTRS transmission is enabled via RRC signaling, the BW threshold $N_{RB0}$ may necessarily less than $S_k$. Therefore, $S_k$ can be excluded from the subset for the BW threshold $N_{RB0}$. It is to be understood that if PTRS transmission is disabled via RRC signaling, there may be no need to indicate the BW thresholds $N_{RB0}$ and $N_{RB1}$ at all.

As shown in Table 2, if the scheduled BW $N_{RB} < N_{RB0}$, PTRS is not present. In some embodiments, there may be no need to configure PTRS in case of a relatively small scheduled BW. That is, the BW threshold $N_{RB0}$ should be not less than a predetermined threshold M. For example, M may be equal to 3 at least for DL PTRS. In some embodiments, the UL PTRS may be always present. In this case, the BW threshold $N_{RB0}$ can be fixed to 1. That is, there may be no need to select the subset for the BW threshold $N_{RB0}$. In addition, in this case, there may be no need to indicate the BW threshold $N_{RB0}$ to the terminal device 120.

In some embodiments, for the time density of PTRS, a plurality of MCS thresholds ptrs-$MCS_1$~ptrs-$MCS_3$ as shown in Table 1 need to be configured to the terminal device 120. Therefore, respective subsets of candidate thresholds can be selected for the plurality of MCS thresholds respectively.

Figure 5:
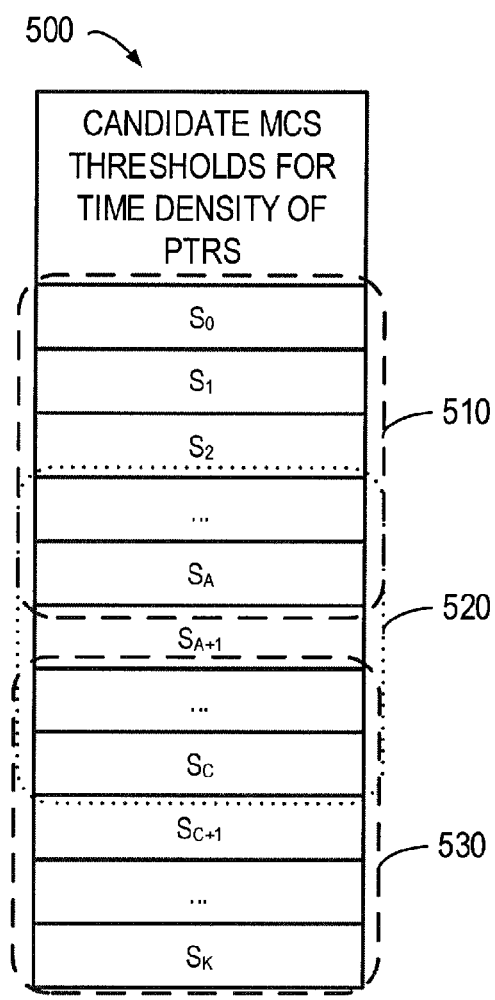
FIG. 5 shows a schematic diagram of different subsets determined for different MCS thresholds according to some embodiments of the present disclosure.

For example, FIG. 5 shows an example of such embodiments. In FIG. 5, for example, we suppose that all possible values for a MCS threshold include {0, 1, 2, . . . 29}, and the MCS threshold ptrs-$MCS_4$ is fixed to 29. The set of candidate thresholds 500 determined in act 310 can be represented as $\{S_0, S_1, S_2, \ldots S_k\}$, where K is an integer, $0 \leq K \leq 29$ and $0 \leq S_k \leq 29$. As shown in FIG. 5, a subset 510 can be selected from the set 500 for the MCS threshold ptrs-$MCS_1$, a subset 520 can be selected from the set 500 for the MCS threshold ptrs-$MCS_2$ and a subset 530 can be selected from the set 500 for the MCS threshold ptrs-$MCS_3$. For example, the subset 510 may be $\{S_1, S_2, \ldots S_A\}$, the subset 520 may be $\{S_B, S_{B+1}, \ldots S_C\}$, and the subset 530 may be $\{S_D, S_{D+1}, \ldots S_K\}$; where A-D are all integers and each of their values is between 0 and 29. In some embodiments, the subsets 510-530 can be overlapped with each other as shown in FIG. 5. In this case, for example, B<A<D<C. In other embodiments, the subsets 510-530 may not be overlapped with each other. In this case, for example, A<B<C<D. In some embodiments, any of the subsets 510-530 can be continuously selected from the set 500 as shown in FIG. 5. In other embodiments, at least one of the subsets 510-530 may not be continuously selected from the set 500.

In some embodiments, some additional factors can be considered in selecting respective subsets for different MCS thresholds.

For example, in some embodiments, if the time density of 1/4 as shown in Table 1 is disabled, the MCS threshold ptrs-MCS$_1$ can be equal to the MCS threshold ptrs-MCS$_2$. That is, the subset for the MCS threshold ptrs-MCS$_1$ can be same as that for the MCS threshold ptrs-MCS$_2$. In some embodiments, if the time density of 1/2 as shown in Table 1 is disabled, the MCS threshold ptrs-MCS2 can be equal to the MCS threshold ptrs-MCS$_3$. That is, the subset for the MCS threshold ptrs-MCS2 can be same as that for the MCS threshold ptrs-MCS$_3$. In some embodiments, if the time density of 1 as shown in Table 1 is disabled, the MCS threshold ptrs-MCS$_3$ can be equal to the MCS threshold ptrs-MCS$_4$. That is, the subset for the MCS threshold ptrs-MCS$_3$ can be same as that for the MCS threshold ptrs-MCS$_4$.

In some embodiments, if PTRS transmission is enabled via RRC signaling, the MCS threshold ptrs-MCS$_1$ may be necessarily less than $S_k$ (for example, $S_k$ may be 29 or 28). Therefore, $S_k$ can be excluded from the subset for the BW threshold ptrs-MCS$_1$. It is to be understood that if PTRS transmission is disabled via RRC signaling, there may be no need to indicate the MCS thresholds ptrs-MCS$_1$~ptrs-MCS$_4$ at all.

As shown in Table 1, if the scheduled MCS is less than the threshold ptrs-MCS$_1$, PTRS is not present. In some embodiments, there may be no need to configure PTRS in case of a relatively small scheduled MCS. That is, the MCS threshold ptrs-MCS$_1$ should be not less than a predetermined threshold N. In some embodiments, N may be equal to 10 in case that all possible values for a MCS threshold include {0, 1, 2, ... 29}. In this case, each of the subsets for the MCS thresholds ptrs-MCS$_1$~ptrs-MCS$_4$ should not include any value between 0 and 9. Alternatively, in some embodiments, N may be equal to 5 in case that all possible values for a MCS threshold include {0, 1, 2, ... 28}. In this case, each of the subsets for the MCS thresholds ptrs-MCS$_1$~ptrs-MCS$_4$ should not include any value between 0 and 4.

In some embodiments, the UL PTRS may be always present. In this case, the MCS threshold ptrs-MCS$_1$ can be fixed to 0. That is, there may be no need to select the subset for the MCS threshold ptrs-MCS$_1$. In addition, in this case, there may be no need to indicate the MCS threshold ptrs-MCS$_1$ to the terminal device 120.

In act 330, the network device 110 selects, from among the at least one subset of candidates thresholds, at least one threshold to be used by the terminal device 120 for determining the density of the PTRS. Then, in act 340, the network device 110 transmits an indication of the at least one threshold to the terminal device 120.

In some embodiments, for any one of the thresholds $N_{RB0}$, $N_{RB1}$ and ptrs-MCS$_1$~ptrs-MCS$_4$, a number of bits for indicating this threshold can be determined based on the number of candidate thresholds in the respective subset of candidate thresholds for this threshold. For example, if the number of candidate thresholds in the respective subset of candidate thresholds for this threshold is p (where p is an integer and p>0), the number of bits for indicating this threshold can be determined to be: q=ceil(log$_2$ p). In some embodiments, the network device 110 can transmit the indication of this threshold in the determined number of bits. For example, in some embodiments, q bits in RRC signaling can be used to indicate this threshold.

As described above, for the frequency density of the PTRS, there are two BW thresholds $N_{RB0}$ and $N_{RB1}$ to be configured. In some embodiments, in order to further reduce the signaling overhead for indicating these two BW thresholds $N_{RB0}$ and $N_{RB1}$, a number of bits for indicating these two BW thresholds $N_{RB0}$ and $N_{RB1}$ can be determined based on the number of candidate combinations of the BW thresholds $N_{RB0}$ and $N_{RB1}$. Only for the purpose of illustration, we suppose that both of the BW thresholds $N_{RB0}$ and $N_{RB1}$ can be selected from $\{n_1, n_2, n_3, \ldots n_Q\}$, where Q is an integer, 1≤Q≤276 and 1≤$n_{Q-1}$<$n_Q$≤276. Since the BW threshold $N_{RB1}$ should be not less than the BW threshold $N_{RB0}$, if the BW threshold $N_{RB0}$ equals to $n_1$, the BW threshold $N_{RB1}$ can be selected from $\{n_1, n_2, n_3, \ldots n_Q\}$. If the BW threshold $N_{RB0}$ equals to $n_2$, the BW threshold $N_{RB1}$ can only be selected from $\{n_2, n_3, n_4, \ldots n_Q\}$. If the BW threshold $N_{RB0}$ equals to $n_3$, the BW threshold $N_{RB1}$ can only be selected from $\{n_3, n_4, n_5, \ldots n_Q\}$. Likewise, if the BW threshold $N_{RB0}$ equal to $n_Q$, the BW threshold $N_{RB1}$ may necessarily be $n_Q$. In this way, the total number of candidate combinations of the BW thresholds $N_{RB0}$ and $N_{RB1}$ may be determined as: Q+(Q−1)+(Q−2)+ ... +1=Q(Q+1)/2. That is, the number of bits for indicating these two BW thresholds $N_{RB0}$ and $N_{RB1}$ can be determined as: ceil(log$_2$ (Q(Q+1)/2)), which is significantly less than the number of bits required for indicating these two BW thresholds $N_{RB0}$ and $N_{RB1}$ in traditional solutions (it is clear that, in traditional solutions, the number of bits for indicating these two BW thresholds $N_{RB0}$ and $N_{RB1}$ may be 2ceil(log$_2$ Q), which is much greater than ceil(log$_2$(Q(Q+1)/2))). It is to be understood that, the signaling overhead for indicating the MCS thresholds ptrs-MCS$_1$~ptrs-MCS$_3$ in Table 1, and/or the signaling overhead for indicating the BW thresholds $N_{RB0}$~$N_{RB4}$ in Table 3 can be further reduced in a similar manner as described above.

In some embodiments, for the frequency density and/or the group pattern of PTRS, several BW thresholds (for example $N_{RB\_0}$, $N_{RB\_1}$, ... $N_{RB\_L}$, where L is an integer and the number of BW thresholds is L+1) may need to be configured to the terminal device 120. Possible values of one of these BW thresholds can be selected from the set of candidate thresholds. Respective values of other thresholds may be configured based on respective offset values relative to the one of the thresholds.

In one embodiment, possible values of the BW threshold $N_{RB\_0}$ may include $\{T_0, T_1, T_2, \ldots T_M\}$, where M is an integer and the number of possible values for $N_{RB\_0}$ is M+1. Some or all of the values $\{T_0, T_1, T_2, \ldots T_M\}$ may be selected from the set of candidate thresholds $\{S_0, S_1, S_2, \ldots S_k\}$. The value of the BW threshold $N_{RB\_p}$ (2≤p≤L) may be configured based on one of offset values $\{\Delta_{p\_0}, \Delta_{p\_1}, \Delta_{p\_2}, \ldots \Delta_{p\_N}\}$, where $\Delta_{p\_j}$ (0≤j≤N) represents an offset value relative to the BW threshold $N_{RB0}$, p_N is an integer and the number of possible offset values for $N_{RB\_p}$ is p_N+1. For different BW thresholds, respective values of p_N may be different. For example, the value of the BW threshold $N_{RB\_p}$ may be determined to be $T_i+\Delta_{p\_j}$, where i and j are both integers, 0≤i≤M and 0≤j≤N.

In another embodiment, possible values of the BW threshold $N_{RB0}$ may include $\{T_0, T_1, T_2, \ldots T_M\}$, where M is an integer and the number of possible values for $N_{RB\_0}$ is M+1.

Some or all of the set $\{T_0, T_1, T_2, \ldots T_M\}$ may be selected from the set of candidate thresholds $\{S_0, S_1, S_2, \ldots S_k\}$. The value of the BW threshold $N_{RB\_p}$ (2≤p≤L) may be configured based on one of $\{\Delta_{p\_0}, \Delta_{p\_1}, \Delta_{p\_2}, \ldots \Delta_{p\_N}\}$, where $\Delta_{p\_j}$ (0≤j≤N) represents an offset value relative to the previous BW threshold $N_{RB\_p-1}$, p_N is an integer and the number of possible offset values for $N_{RB\_p}$ is p_N+1. For example, the value of the BW threshold $N_{RB\_p}$ may be determined to be $N_{RB\_p-1}+\Delta_{p\_j}$, where j is an integer and 0≤j≤N.

In some embodiments, respective offset values for different BW thresholds may be the same as or different from each other. Alternatively, or in addition, for different BW thresholds, respective numbers of possible offset values may be the same as or different from each other. In some embodiments, each of the set of offset values $\{\Delta_{p\_0}, \Delta_{p\_1}, \Delta_{p\_2}, \ldots \Delta_{p\_N}\}$ may be an integer and no less than 0.

In some embodiments, for the time density of PTRS, several MCS thresholds (for example ptrs-$MCS_0$, ptrs-$MCS_1$, ... ptrs-$MCS_L$, where L is an integer and the number of MCS thresholds is L+1) may need to be configured to the terminal device 120. Possible values of one of these thresholds can be selected from the set of candidate thresholds. Respective values of other thresholds may be configured based on respective offset values relative to the one of the thresholds.

In one embodiment, possible values of the MCS threshold ptrs-$MCS_0$ may include $\{T_0, T_1, T_2, \ldots T_M\}$, where M is an integer and the number of possible values for ptrs-$MCS_0$ is M+1. Some or all of the values $\{T_0, T_1, T_2, \ldots T_M\}$ may be from the set of candidate thresholds $\{S_0, S_1, S_2, \ldots S_k\}$. The value of the MCS threshold ptrs-$MCS_p$ (2≤p≤L) may be configured based on one of offset values $\{\Delta_{p\_0}, \Delta_{p\_1}, \Delta_{p\_2}, \ldots \Delta_{p\_N}\}$, where $\Delta_{p\_j}$ (0≤j≤N) represents an offset value relative to the MCS threshold ptrs-$MCS_0$, p_N is an integer and the number of possible offset values for ptrs-$MCS_{p\ is\ p\_N}+1$. For different MCS thresholds, respective values of p_N may be different. For example, the value of the MCS threshold ptrs-$MCS_p$ may be $T_i+\Delta_{p\_j}$, where i and j are both integers, 0≤i≤M and 0≤j≤N.

In another embodiment, possible values of the MCS threshold ptrs-$MCS_0$ may include $\{T_0, T_1, T_2, \ldots T_M\}$, where M is an integer and the number of possible values for ptrs-$MCS_0$ is M+1. Some or all of the values $\{T_0, T_1, T_2, \ldots T_M\}$ may be from the set of candidate thresholds $\{S_0, S_1, S_2, \ldots S_k\}$. The value of the MCS threshold ptrs-$MCS_p$ (2≤p≤L) may be configured based on one of offset values $\{\Delta_{p\_0}, \Delta_{p\_1}, \Delta_{p\_2}, \ldots \Delta_{p\_N}\}$, where $\Delta_{p\_j}$ (0≤j≤N) represents an offset value relative to the previous MCS threshold ptrs-$MCS_{p-1}$, p_N is an integer and the number of possible offset values for ptrs-$MCS_p$ is p_N+1. For example, the value of the MCS threshold ptrs-$MCS_p$ may be ptrs-$MCS_{p-1}+\Delta_{p\_j}$, where j is an integer and 0≤j≤N.

In some embodiments, respective offset values for different MCS thresholds may be the same as or different from each other. Alternatively, or in addition, for different MCS thresholds, respective numbers of possible offset values may be the same as or different from each other. In some embodiments, each of the set of offset values $\{\Delta_{p\_0}, \Delta_{p\_1}, \Delta_{p\_2}, \ldots \Delta_{p\_N}\}$ may be an integer and no less than 0.

In some embodiments, for the frequency density of PTRS, two BW thresholds $N_{RB0}$ and $N_{RB1}$ as shown in Table 2 need to be configured to the terminal device 120. The possible subset of values of the BW threshold $N_{RB0}$ may be selected from the set of candidate thresholds, for example $\{T_0, T_1, T_2, \ldots T_M\}$, where M is an integer and the number of possible values for the BW threshold $N_{RB0}$ is M+1. Some or all of the values $\{T_0, T_1, T_2, \ldots T_M\}$ may be selected from the set of candidate thresholds $\{S_0, S_1, S_2, \ldots S_k\}$. The possible values of the BW threshold $N_{RB1}$ may be configured based on offset values relative to the BW threshold $N_{RB0}$. For example, the value of the BW threshold $N_{RB1}$ may be configured based on one of offset values $\{\Delta_0, \Delta_1, \Delta_2, \ldots \Delta_N\}$, where N is an integer and the number of possible offset values for the BW threshold $N_{RB1}$ is N+1. For example, the value of the BW threshold $N_{RB1}$ may be $T_i+\Delta_j$, where i and j are both integers, 0≤i≤M and 0≤j≤N. In some embodiments, each of the set of offset values $\{\Delta_0, \Delta_1, \Delta_2, \ldots \Delta_N\}$ may be an integer and no less than 0.

Figure 6:
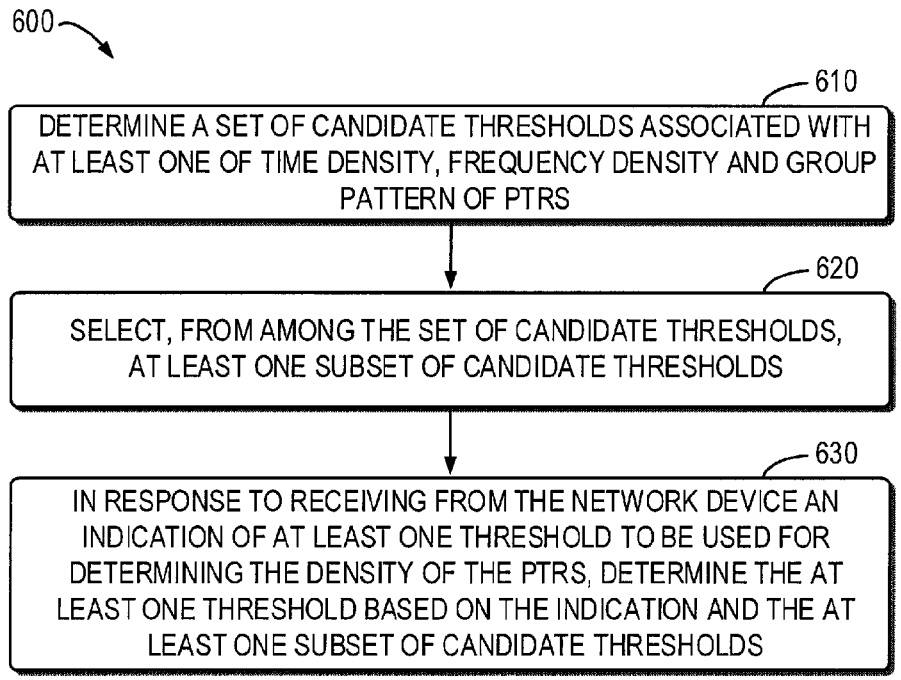
FIG. 6 shows a flowchart of an example method 600 in accordance with some embodiments of the present disclosure.

FIG. 6 shows a flowchart of an example method 600 in accordance with some embodiments of the present disclosure. The method 600 can be implemented at the terminal device 120 as shown in FIG. 1. For the purpose of discussion, the method 600 will be described from the perspective of the terminal device 120 with reference to FIG. 1.

In act 610, the terminal device 120 determines a set of candidate thresholds associated with at least one of time density, frequency density and group pattern of Phase Tracking Reference Signal (PTRS) to be transmitted between a network device and the terminal device.

In some embodiments, the PTRS is one of the following: an uplink PTRS to be transmitted from the terminal device 120 to the network device 110; and a downlink PTRS to be transmitted from the network device 110 to the terminal device 120.

In some embodiments, the terminal device 120 may determine the set of candidate thresholds associated with the frequency density and/or the group pattern of the PTRS, such that each of the set of candidate thresholds is within a predetermined range.

In some embodiments, the terminal device 120 may determine the set of candidate thresholds associated with the frequency density and/or the group pattern of the PTRS, such that at least one of the set of candidate thresholds is a power of 2.

In some embodiments, the terminal device 120 may determine the set of candidate thresholds associated with the frequency density and/or the group pattern of the PTRS, such that at least one of the set of candidate thresholds is a square of a natural number.

In some embodiments, the terminal device 120 may determine, based on a predetermined modulation order, the set of candidate thresholds associated with the time density of the PTRS. In some embodiments, the terminal device 120 may determine, based on the predetermined modulation order, a step size for reducing the number of candidate thresholds in the set of candidate thresholds associated with the time density of the PTRS. The terminal device 120 may apply the step size to reduce the number of candidate thresholds in the set of candidate thresholds associated with the time density of the PTRS.

In some embodiments, the terminal device 120 may determine the set of candidate thresholds in a similar manner as the network device 110 (that is, the act 610 performed by the terminal device 120 is similar as the act 310 performed by the network device 110). For the purpose of simplification, the details about the act 610 will be omitted here.

In act 620, the terminal device 120 selects, from among the set of candidate thresholds, at least one subset of candidate thresholds.

In some embodiments, the terminal device 120 may select the at least one subset of candidate thresholds in a similar manner as the network device 110 (that is, the act 620 performed by the terminal device 120 is similar as the act 320 performed by the network device 110). For the purpose of simplification, the details about the act 620 will be omitted here.

In act 630, in response to receiving from the network device an indication of at least one threshold to be used for determining the density of the PTRS, the terminal device 120 determines the at least one threshold based on the indication and the at least one subset of candidate thresholds.

In some embodiments, the terminal device 120 receives, via higher layer signaling, the indication of the at least one threshold from the network device.

In some embodiments, the terminal device 120 determines the density of the PTRS based on the at least one threshold, the density of the PTRS is one of time and frequency densities of the PTRS.

In some embodiments, a same rule to reduce the signaling overhead for configuring different thresholds for at least one of time density, frequency density and group pattern of PTRS may be preconfigured in both the network device 110 and the terminal device 120. The network device 110 may configure different thresholds for at least one of time density, frequency density and group pattern of PTRS to the terminal device 120 based on the rule. Accordingly, the terminal device 120 may determine the time density, frequency density and/or group pattern of PTRS based on the same rule and the information received from the network device 110. In this way, the signaling overhead of configuring different threshold for the time density, frequency density and/or group pattern of PTRS can be greatly reduced according to the embodiments of the present disclose.

Figure 7:
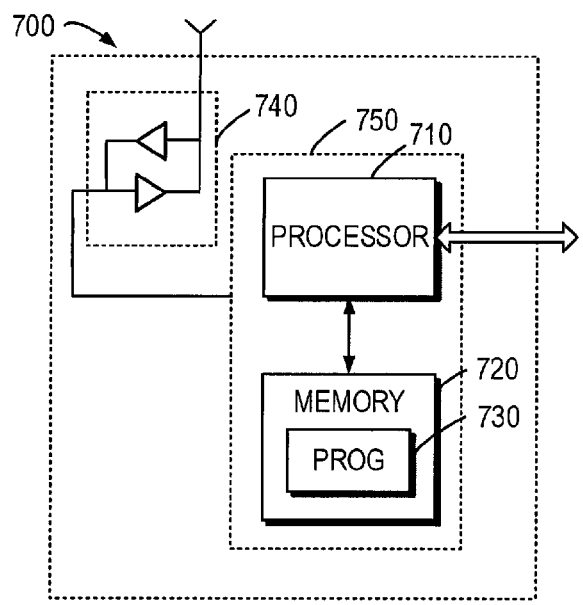
FIG. 7 is a simplified block diagram of a device that is suitable for implementing embodiments of the present disclosure.

FIG. 7 is a simplified block diagram of a device 700 that is suitable for implementing embodiments of the present disclosure. The device 700 can be considered as a further example implementation of a network device 110 or a terminal device 120 as shown in FIG. 1. Accordingly, the device 700 can be implemented at or as at least a part of the network device 110 or the terminal device 120.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 710 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the embodiments of the present disclosure, as discussed herein with reference to FIGS. 1 to 9. The embodiments herein may be implemented by computer software executable by the processor 710 of the device 700, or by hardware, or by a combination of software and hardware. The processor 710 may be configured to implement various embodiments of the present disclosure. Furthermore, a combination of the processor 710 and memory 710 may form processing means 750 adapted to implement various embodiments of the present disclosure.

The memory 710 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 710 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 1 to 9. Generally, program modules include routines, programs, libraries, objects, classes, components, data structures, or the like that perform particular tasks or implement particular abstract data types. The functionality of the program modules may be combined or split between program modules as desired in various embodiments.

Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device.

The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented in a network device, comprising:
    determining a set of candidate thresholds associated with at least one of time density, frequency density and group pattern of Phase Tracking Reference Signal (PTRS) to be transmitted between the network device and a terminal device;
    selecting, from among the set of candidate thresholds, at least one subset of candidate thresholds;
    selecting, from among the at least one subset of candidate thresholds, at least one threshold to be used by the terminal device for determining the density of the PTRS; and
    transmitting an indication of the at least one threshold to the terminal device,
    wherein determining the set of candidate thresholds comprises:
    determining, based on a predetermined modulation order, the set of candidate thresholds associated with the time density of the PTRS,
    determining, based on the predetermined modulation order, a step size for reducing the number of candidate thresholds in the set of candidate thresholds associated with the time density of the PTRS; and
    applying the step size to reduce the number of candidate thresholds in the set of candidate thresholds associated with the time density of the PTRS.

2. The method of claim 1, wherein the PTRS is one of the following:
    an uplink PTRS to be transmitted from the terminal device to the network device; and
    a downlink PTRS to be transmitted from the network device to the terminal device.

3. The method of claim 1, wherein transmitting the indication of the at least one threshold to the terminal device comprises:
    determining, based on the number of candidate thresholds in the at least one subset of candidate thresholds, a number of bits for indicating the at least one threshold; and
    transmitting the indication of the at least one threshold in the determined number of bits.

4. The method of claim 1, wherein transmitting the indication of the at least one threshold to the terminal device comprises:
    transmitting, via higher layer signaling, the indication of the at least one threshold to the terminal device.

5. A method implemented in a terminal device, comprising:
    determining a set of candidate thresholds associated with at least one of time density, frequency density and group pattern of Phase Tracking Reference Signal (PTRS) to be transmitted between a network device and the terminal device;
    selecting, from among the set of candidate thresholds, at least one subset of candidate thresholds; and
    in response to receiving from the network device an indication of at least one threshold to be used for determining the density of the PTRS, determining the at least one threshold based on the indication and the at least one subset of candidate thresholds,
    wherein determining the set of candidate thresholds comprises:
    determining, based on a predetermined modulation order, the set of candidate thresholds associated with the time density of the PTRS,
    determining, based on the predetermined modulation order, a step size for reducing the number of candidate thresholds in the set of candidate thresholds associated with the time density of the PTRS; and
    applying the step size to reduce the number of candidate thresholds in the set of candidate thresholds associated with the time density of the PTRS.

6. The method of claim 5, wherein the PTRS is one of the following:
    an uplink PTRS to be transmitted from the terminal device to the network device; and
    a downlink PTRS to be transmitted from the network device to the terminal device.

7. The method of claim 5, wherein receiving the indication of at least one threshold comprises:
    receiving, via higher layer signaling, the indication of the at least one threshold from the network device.

8. A network device comprising:
    a processor; and
    a memory coupled to the processor and storing instructions thereon, the instructions, when executed by the processor, causing the network device to:
    determine a set of candidate thresholds associated with at least one of time density, frequency density and group pattern of Phase Tracking Reference Signal (PTRS) to be transmitted between the network device and a terminal device;

select, from among the set of candidate thresholds, at least one subset of candidate thresholds;
select, from among the at least one subset of candidate thresholds, at least one threshold to be used by the terminal device for determining the density of the PTRS; and
transmit an indication of the at least one threshold to the terminal device,
wherein determining the set of candidate thresholds comprises:
determining, based on a predetermined modulation order, the set of candidate thresholds associated with the time density of the PTRS,
determining, based on the predetermined modulation order, a step size for reducing the number of candidate thresholds in the set of candidate thresholds associated with the time density of the PTRS; and
applying the step size to reduce the number of candidate thresholds in the set of candidate thresholds associated with the time density of the PTRS.

9. The network device of claim 8, wherein the PTRS is one of the following:
an uplink PTRS to be transmitted from the terminal device to the network device; and
a downlink PTRS to be transmitted from the network device to the terminal device.

* * * * *